INVENTOR.
CLAYTON DU BOSQUE, JR.
BY
ATTORNEY

Nov. 10, 1970   C. DU BOSQUE, JR   3,539,415
MULTIPLE UNIT HIGH SPEED APPARATUS FOR APPLYING
TREAD TO TIRE CASINGS
Filed Oct. 12, 1967   3 Sheets-Sheet 3

INVENTOR.
CLAYTON DU BOSQUE, JR.
BY
ATTORNEY

United States Patent Office 3,539,415
Patented Nov. 10, 1970

3,539,415
MULTIPLE UNIT HIGH SPEED APPARATUS FOR APPLYING TREAD TO TIRE CASINGS
Clayton Du Bosque, Jr., New Canaan, Conn., assignor to American Machine & Foundry Company, a corporation of New Jersey
Filed Oct. 12, 1967, Ser. No. 674,801
Int. Cl. B29h *17/10*
U.S. Cl. 156—397      5 Claims

ABSTRACT OF THE DISCLOSURE

A high-speed method and apparatus for applying tread to detreaded, used tire casing. The apparatus comprises an indexing unit having at least two hubs for mounting tire casings thereon and a tire building station and a loading station located on opposite sides of the indexing unit. In operation, one of the tire casings is indexed into the building station while the other recapped casing moves into the loading station where it is unloaded and a new casing mounted on the hub thus permitting a nearly continuous recapping operation. The apparatus also includes a separate extruder for supplying a strip of rubber to the casing at the building station over guide means including a dancer arm and a swinging application arm which permits the rubber strip to be switched between the mounted tire casings. An incremental programming arrangement may be provided to control the movement of the application arm.

BACKGROUND OF THE INVENTION

This invention relates to tire manufacture and particularly to a high-speed apparatus for applying a predetermined tread thickness to a tire casing. While other apparatus for building a tire tread by applying a ribbon to a base structure are disclosed in the following patents 3,268,380 to L. G. Guichon et al.; 3,223,572 to R. W. Holloway et al.; 3,177,198 to R. G. Holman, the present invention represents a distinct improvement thereover. In the unique apparatus of the present invention the completed tire is indexed to an unloading position and a casing is simultaneously brought into the work position. Consequently, there is no wasted time caused by a loading and unloading interval.

SUMMARY OF THE INVENTION

Accordingly, the object of this invention is to provide a new and improved method and apparatus for recapping tires at an extremely rapid rate.

With the above and other objects and advantages in view, the present invention pertains to a unique method and apparatus for producing recapped tires by applying extruded tread rubber to detreaded, used, inspected tire casing. The apparatus comprises an indexing unit having at least two hubs mounted at opposite ends thereof for movement into and out of a tire building station and a loading or spin and index station. In operation, one of the tire casings is indexed into the building station while the other recapped casing which is mounted on a hub opposite the first tire casing moves into the loading position where it is unloaded. A new tire casing is mounted on the hub while the other tire casing is being recapped thus permitting a nearly continuous recapping operation. The apparatus also includes a retractable swinging application arm which permits the rubber strip to be switched between the tire casings and an incremental program arrangement to control the movement of the application arm.

BRIEF DESCRIPTION OF THE DRAWINGS

The features of the present invention will be more clearly understood when viewed in conjunction with the accompanying drawings wherein.

DESCRIPTION OF THE PREFERRED EMBODIMENTS

Figure 1:
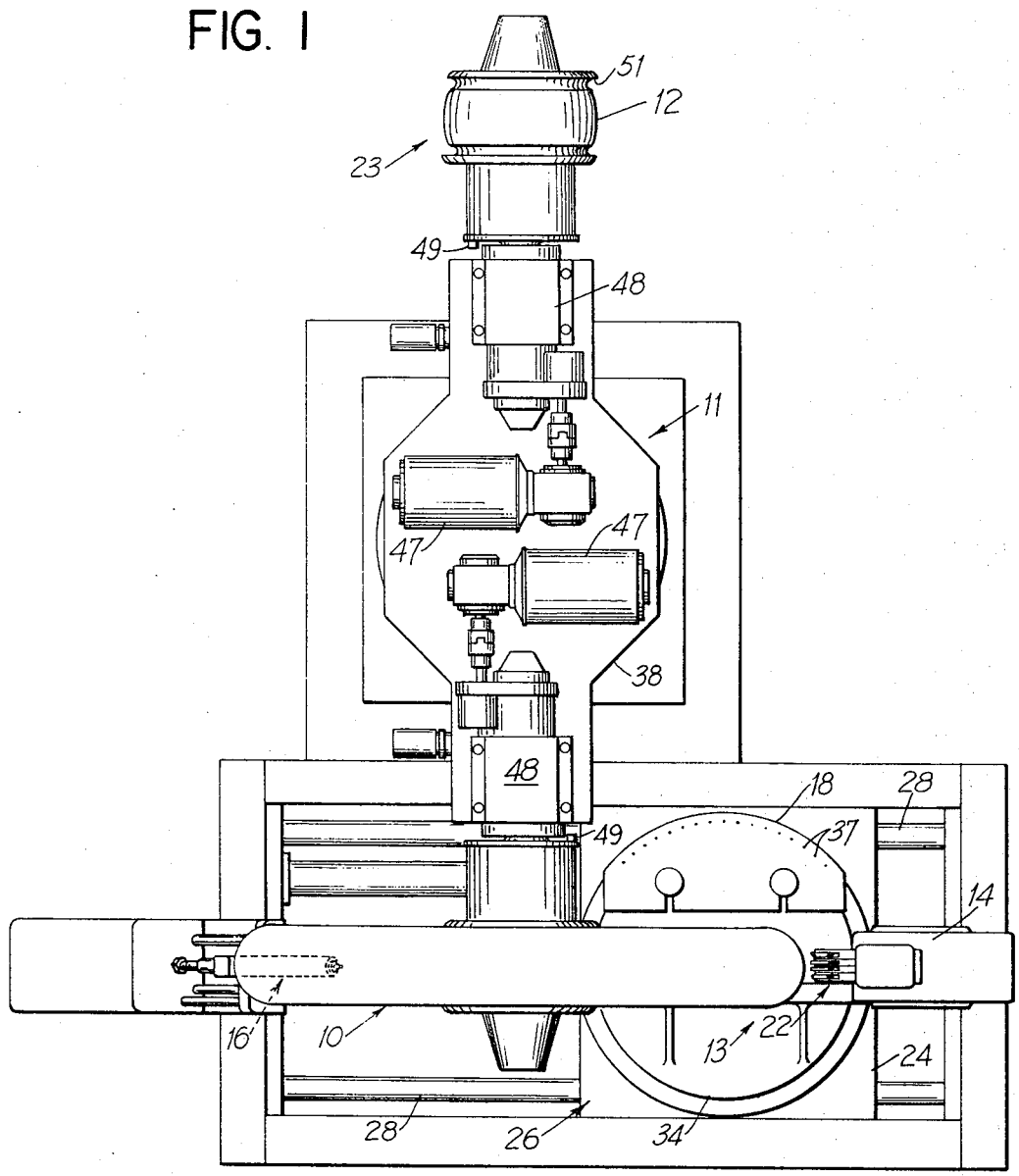
FIG. 1 is a top view of the new and improved apparatus of the present invention for producing recapped tires.

Referring now to the drawings, the present invention relates to a high speed method and apparatus for applying tread to tire casings 10 which includes an indexing unit 11 having a pair of hubs 12 mounted thereon for movement into and out of a tire building station 13. The tire building station 13 includes an application or azimuth arm 14 and a sensing arm 16 for controlling the application of tread 17 to a tire casing in the general manner disclosed in Pat. 3,177,918 to R. G. Holman. According to this method, a strip or ribbon of rubber 17 is applied to a tire casing 10 in a series of overlapping turns by the application arm 14 while the sensing arm 16 which is mounted on the opposite side of the casing 10 controls the movement of the application arm 14 across the tire casing 16 in accordance with a program template 18 to build a predetermined tread contour.

Present recapping equipment is limited in capacity due to the fact that the machine must be stopped, the completed tire removed and a new casing 10 loaded on the hub 12. However, in the present invention, the completed tire is indexed from the tire building station 13 to an unloading station 23 while a new casing 10 is simultaneously indexed into the building station. Thus, the shut-down interval is minimized and the equipment may be utilized more efficiently. While the invention is illustrated employing two expandable hubs 12 of the type disclosed in Pat. 3,291,171 to W. E. F. Lehmann, the apparatus may be, of course, provided with a plurality of such hubs 12 for indexing into and out of a plurality of building and unloading stations.

The apparatus of the present invention automatically applies a continuous strip 17 of extruded tread rubber to a tire casing 10 from a temperature controlled extruder (not shown) having an adjustable die head to control the width and thickness of the extruded rubber stock. The ribbon 17 is fed over a dancer assembly (not shown) past the feeder roller assembly 19 to the thickness and width monitoring assembly 21. The ribbon 17 is then applied to the tire casing 10 by the applicator and stitching assembly 22. The application arm 14 is of the general type disclosed in the pending U.S. application of Robert E. Hineline, Ser. No. 656,283, filed July 26, 1967 which is assigned to applicant's assignee and, consequently, will not be described in detail herein. The sensing assembly 16 is also similar to that previously described in Ser. No. 656,283.

Figure 3:
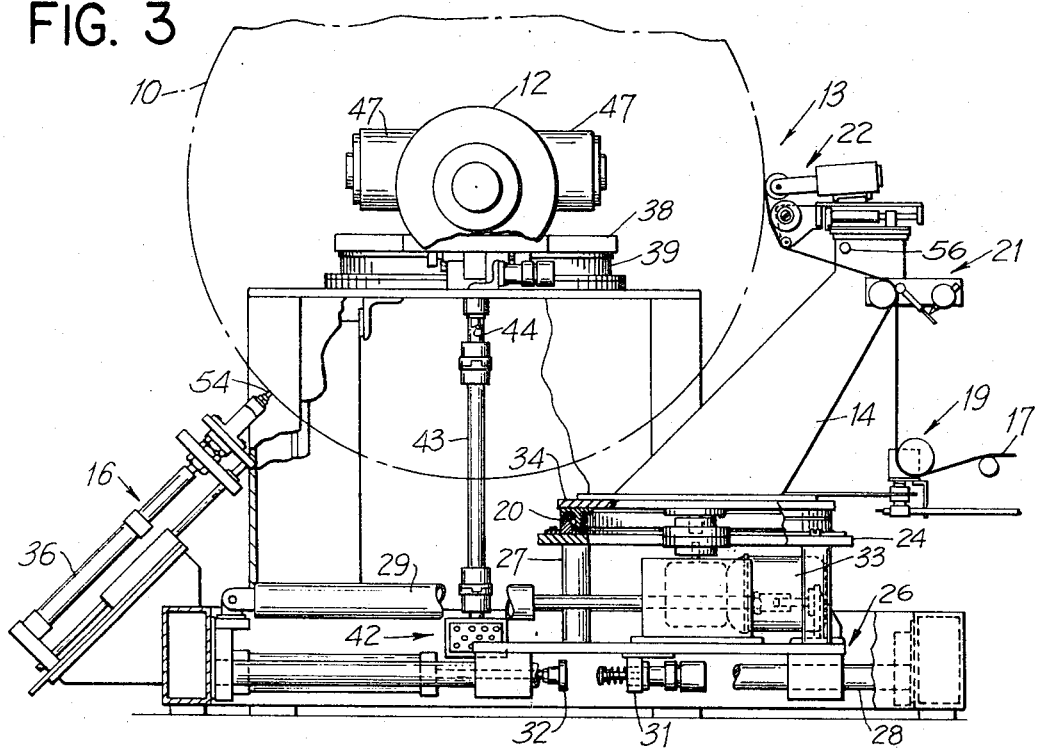
FIG. 3 is a side view of the tire building station with the outline of the tire shown in phantom.

The application arm 14 is rotationally mounted on bearings 20 which are located on the supporting platform 24. The platform 24 in turn, is mounted to the sliding base assembly 26 by means of downwardly extending members 27. The assembly 26 is moved back and forth along guide bars 28 by the sliding base cylinder 29 which is mounted thereto in the manner indicated in FIG. 3. A sliding base shock absorber 31 is also provided to engage element 32.

The application arm 14 is driven by the azimuth motor 33 which is coupled to the base 34 of the arm 14. The azimuth motor drives the arm 14 about the casing 10 in a stepped rotational movement designed to produce a predetermined tread contour. At the same time, the sensor assembly 16 which has been brought into contact with the casing 10 by operation of the valve 36 monitors the ribbon 17 after it has been applied to the casing 10. A switch is actuated when the tread contour at the point being sensed conforms to the template configuration. The azimuth motor 33 is then activated to move the arm 14 a distance corresponding to the space between detents 37 on the program card 18 for the application of the next layer of ribbon 17.

Figure 2:
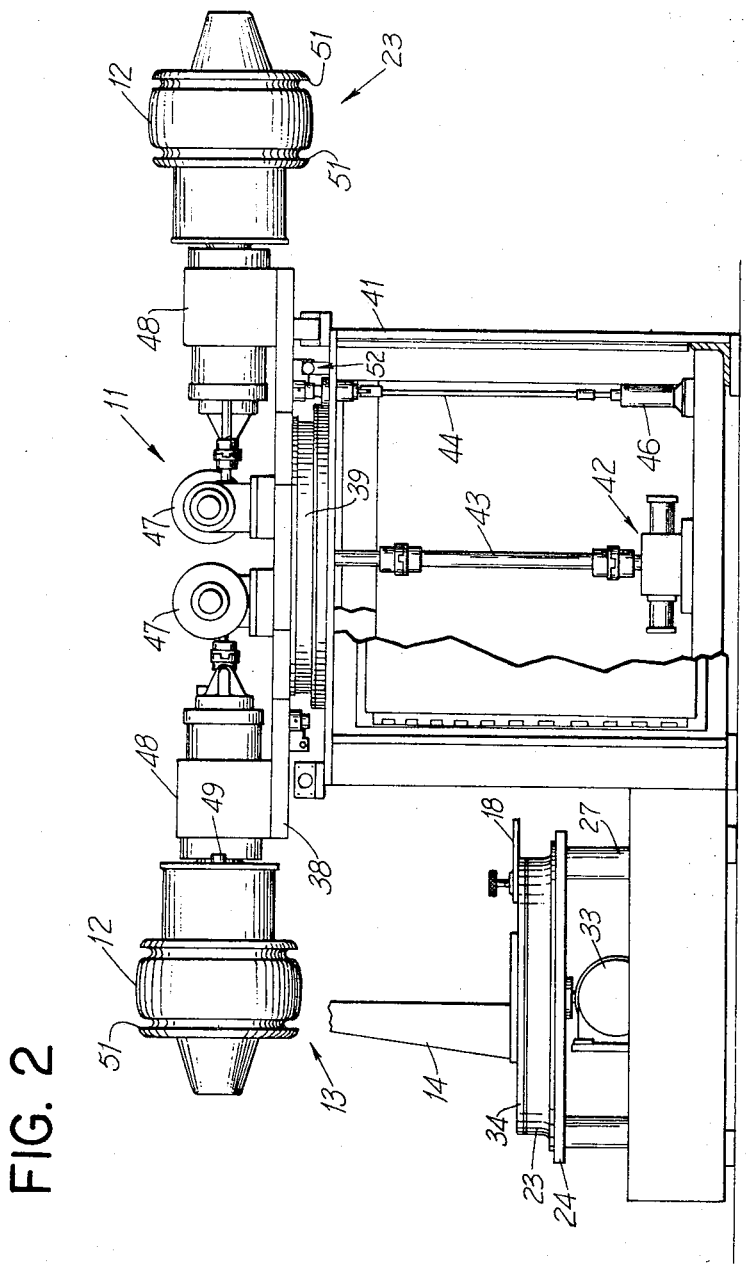
FIG. 2 is a side view of the subject apparatus with portions omitted to more clearly illustrate the operation thereof.

The indexing arrangement is more clearly illustrated in FIG. 2 wherein the indexing table 38 is rotationally mounted on bearing 39 which is supported by frame 41. The table 38 is rotated either clockwise or counter-clockwise by the pneumatic oscillator 42 which is coupled to the table 38 by shaft 43. An indexing locking shaft 44 and control piston 46 is provided to lock the table 38 in position.

The spin motors 47 for each of the tire casings 10 are mounted facing in opposite directions on the table 38 and coupled to the respective hubs 12 by the reduction gearbox assemblies 48. A spin switch 49 is mounted adjacent each of the hubs 12 to activate the motors 47. The spin motors 47 rotate the tire which is being built about its axis to facilitate the application of tread thereon.

In operation, a detreaded casing 10 is mounted on the right hand expandable hub assembly 12 in the loading and unloading station 23, see FIG. 2. The hub 12 is expanded and air is fed simultaneously to the inside of the tire so that both casing beads are forced tightly against the hub rims 51 on the expanded rim assembly. The tire is inflated to 20 p.s.i. air pressure and is firmly seated on the expansion hub. A typical expandable hub 12 and its method of operation is disclosed in Pat. 3,291,171 to W. E. F. Lehmann.

The spin table 38 is indexed 180° to position the casing 10 within the building station 13. The 180° rotation is achieved by energizing the pneumatic oscillator 42 which turns indexing shaft 43 and the connected table 38. On completion of the 180° indexing cycle, the indexing locking shaft 44 is energized by a proximity switch 52 which actuates an air cylinder 46 to lock the spin table 38 firmly in position.

The sensor air cylinder 36 is then extended and the sensor actuating means is operated to drive the sensor switch 54 up to sense the diameter of the tire. This sets the base stop which controls the winding radius. With the winding radius set the sensor cylinder 36 retracts. The program start button 56 is actuated moving the sliding base assembly 26 carrying the application and stitcher assembly 22 into position against the base stop mechanism. The spin motor 47 starts and the casing 10 rotates until it engages the spin motor switch 49 while the azimuth arm 14 moves to the start position on the program switch card 18.

The extruder is started and the ribbon 17 is fed over the dancer arm (not shown) and feeder roller assembly 19 through the thickness and width monitor assembly 21, over the applicator and stitcher assembly 22 and attached to the casing 10 by finger pressure. With the program start button 56 actuated, the ribbon 17 is applied to the casing 10 in the following sequence. Stitcher pressure is applied to the ribbon 17 by the air operated moveable base assembly 26 while the spin motor rotates the casing 10.

When the hub 12 has rotated approximately 300°, it contacts switch 49 which sends a signal to the azimuth drive motor 33 causing the complete azimuth arm assembly 14 to move in a radial direction around the casing 10. As the azimuth arm assembly 14 moves, the program card 18 which is mounted thereon moves across a program switch assembly 57. Program detents 37 on the program card 18 actuate the program switches 57 to stop the azimuth motion, while the spin switch starts the azimuth drive motor 33 to move the azimuth arm off the detents 37.

The start-stop motion of the azimuth arm 14 is a continuous process during which rubber ribbon 17 is applied to the tire. The desired contour and thickness is obtained by variation in detent distances. At the end of the program, the stop detent will actuate a different switch which shuts off the extruder, stops the index motion and spin motion and causes retraction of the azimuth arm assembly 14, the sliding base assembly 26 and the sensing mechanism 16. While the invention is described above including an incremental programming arrangement, it is of course to be understood that other programming arrangements may be used.

The ribbon 17 is then disconnected from the casing 10 and the indexing table 38 is rotated 180° to the unloading station 23. The completed tire is removed by retracting the hub assembly 12 and a new casing is mounted thereon. At the same time, another casing 180° apart has been rotated into the tire building station for tread application. Thus, the machine down time between building operations is drastically reduced.

Figure 4:
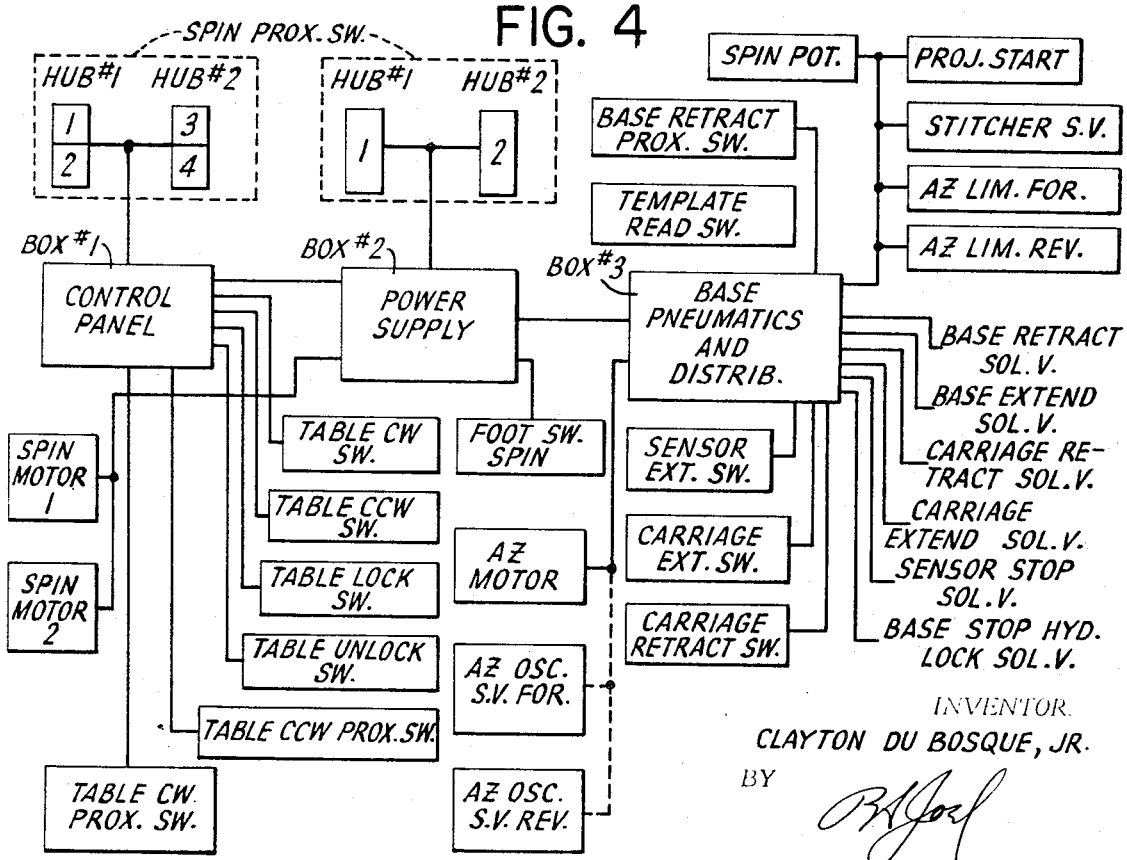
FIG. 4 is a schematic drawing of the electrical control circuit for the apparatus.

The control system for the present invention is illustrated schematically in FIG. 4 with the various elements properly labeled. The system has only been described incidentally insofar as the operation of the apparatus is affected. Portions of the system are already well known and disclosed in the cited prior art patents and consequently do not require further description.

What has been described above are merely illustrative examples of the application of the principles of the invention. Numerous other arrangements may be readily devised by those skilled in the art which will embody the principles of the invention and fall within the scope and spirit thereof.

What is claimed is:

1. An apparatus for applying a strip of tread material to a rotating tire casing comprising:
    an indexing table having at least two hubs mounted on the table for receiving first and second tire casings about the respective hubs,
    a tire building station including a slidable base, an application arm mounted on the base for applying the strip of tread material to the tire casing, means for rotating the application arm about the casing to apply the strip of tread material to the casing in a plurality of overlapping turns and drive means coupled to the slidable base for moving said application arm into and out of position against the tire casing in synchronization with the indexing of a succeeding casing into the tire building station,
    a tire unloading station,
    means for controlling the application of tread material to produce a predetermined tread contour, and
    means for indexing the table after the tire building operation has been completed to rotate the first tire casing out of the tire building station into the tire unloading station and simultaneously therewith rotate the second tire casing into the tire building station so that the completed tire casing can be unloaded while another tire casing is being built.

2. An apparatus in accordance with claim 1 wherein:
    the slidable base includes an upper platform having the application arm rotationally mounted thereon,
    a lower platform having the means for rotating the application arm mounted thereon, means connecting the upper and lower platforms and means connected to the platforms to move the base back and forth to permit indexing of the table.

3. An apparatus in accordance with claim 1 wherein:
the application arm includes a thickness and width monitor assembly for regulating the strip of tread material which is applied to the casing,
a plurality of application rollers for applying the tread to the tire casing and a plurality of stitching rollers for stitching the strip to the casing.

4. An apparatus for applying a strip of tread material to a rotating tire casing comprising:
an indexing table having at least two hubs mounted on the table for receiving first and second tire casings about the respective hubs,
a tire building station,
a tire unloading station,
means for feeding the strip of tread material to a first tire casing at the building station such that the tread material is applied to the casing in a plurality of overlapping turns,
means for controlling the application of tread material to produce a predetermined tread contour including sensing means mounted in engagement with the tread strip after it has been applied to the casing, a program card having a plurality of detents located thereon, switch means mounted to engage the detents and activate the application arm for a predetermined movement across the casing, said switch means being activated by the sensing means when the tread contour corresponds to the desired configuration at the point being sensed, and
means for indexing the table after the tire building operation has been completed to rotate the first tire casing out of the tire building station into the tire unloading station and simultaneously therewith rotate the second tire casing into the tire building station so that the completed tire casing can be unloaded while another tire casing is being built.

5. An apparatus in accordance with claim 4 wherein:
the program card includes a stop at the end of the program controlling the movement of the application arm in increments corresponding to the space between detents and the apparatus further includes switch means engaging the stop to cause movement of the slidable base and the sensing means away from the completed tire casing.

References Cited

UNITED STATES PATENTS

| | | | |
|---|---|---|---|
| 3,223,573 | 12/1965 | Deist | 156—396 |
| 3,264,162 | 8/1966 | Holman | 156—397 |
| 3,291,171 | 12/1966 | Lehmann. | |

BENJAMIN A. BORCHELT, Primary Examiner

C. BENTLEY, Assistant Examiner